E. VINOGRAD AND M. GROTEN.
CAR COUPLING.
APPLICATION FILED JUNE 15, 1918.

1,339,487.

Patented May 11, 1920.

INVENTOR
Eliezer Vinograd,
Maximilian Groten,
BY James F. Duhamel
ATTORNEY

E. VINOGRAD AND M. GROTEN.
CAR COUPLING.
APPLICATION FILED JUNE 15, 1918.
1,339,487.
Patented May 11, 1920.
4 SHEETS—SHEET 2.
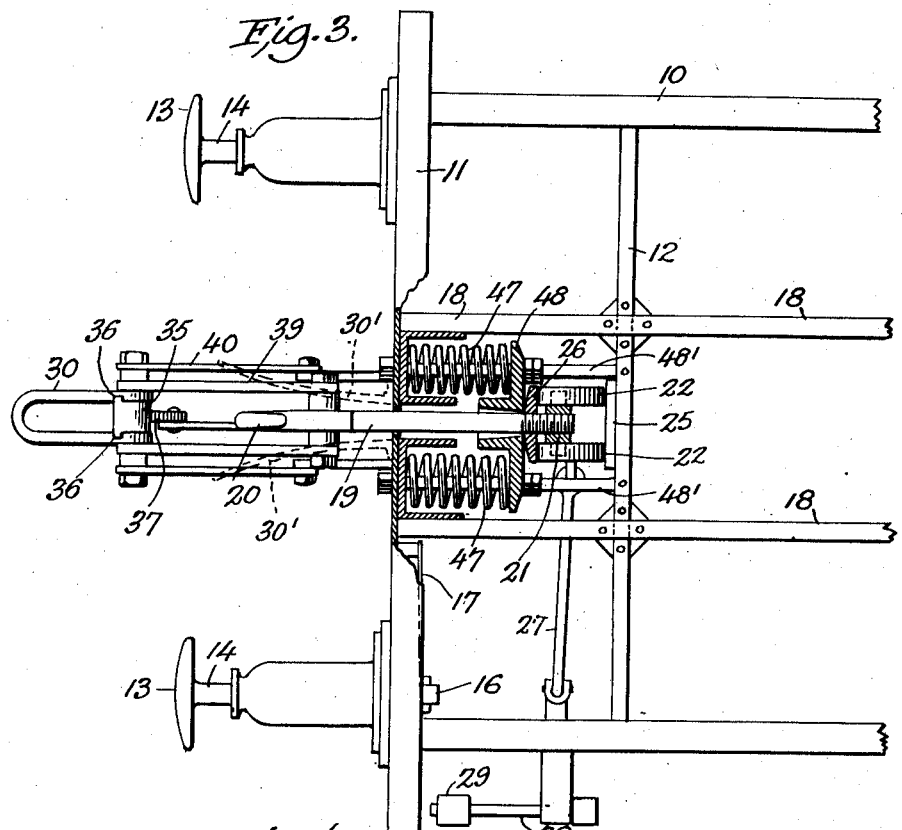
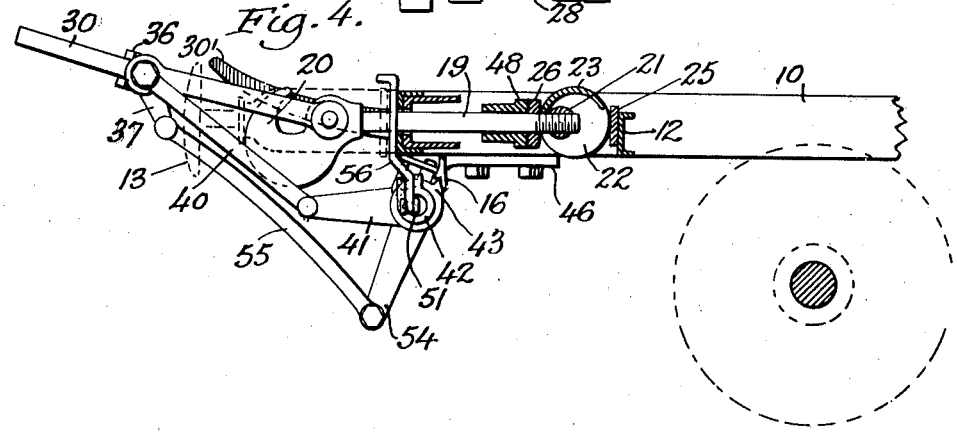
INVENTOR
Eliezer Vinograd,
Maximilian Groten,
BY
James F. Duhamel
ATTORNEY

E. VINOGRAD AND M. GROTEN.
CAR COUPLING.
APPLICATION FILED JUNE 15, 1918.

1,339,487.

Patented May 11, 1920.
4 SHEETS—SHEET 3.

INVENTOR
Eliezer Vinograd,
Maximilian Groten,
BY
James F. Duhamel,
ATTORNEY

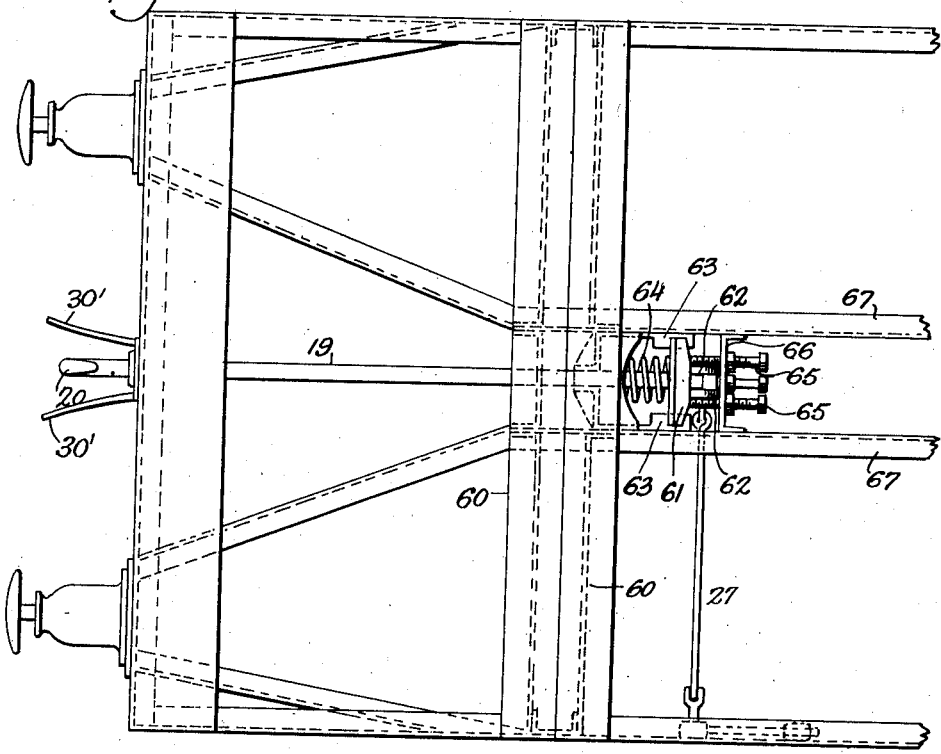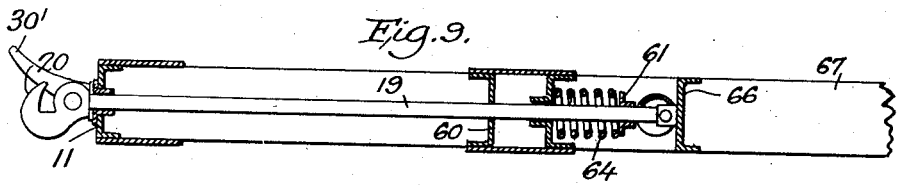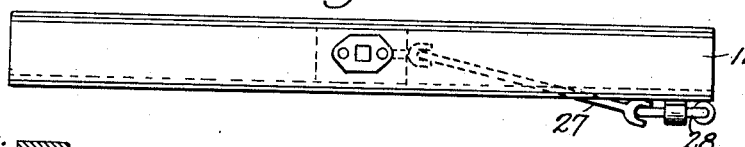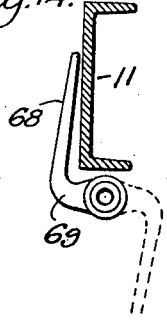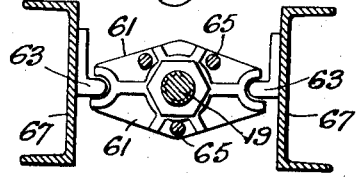

UNITED STATES PATENT OFFICE.

ELIEZER VINOGRAD AND MAXIMILIAN GROTEN, OF NEW YORK, N. Y.

CAR-COUPLING.

1,339,487.  Specification of Letters Patent.  Patented May 11, 1920.

Application filed June 15, 1918. Serial No. 240,271.

*To all whom it may concern:*

Be it known that we, ELIEZER VINOGRAD, a resident of New York, county of Bronx, State of New York, and MAXIMILIAN GROTEN, of the city, county, and State of New York, both citizens of the Republic of Russia, have invented certain new and useful Improvements in Car-Couplings, of which the following is a specification.

This invention relates to car couplers and more especially to automatic couplers for use on cars provided with spring buffers and its object is to provide links carried by rods and arms from the draw bar and adapted to be folded down below the hook at the end of the draw bar and elevated for engagement with the hook of another car and retained in its elevated position but released by the compression of one of the buffers when the cars meet, and allowed to drop into the hook. These and other objects and details of the invention are more fully described in the following specification, set forth in the appended claims and illustrated in the accompanying drawings, wherein:

Fig. 3 is a plan view showing one of the links set.

Fig. 4 is a side view of the same.

Fig. 8 is a modified arrangement of the invention.

Fig. 9 is a sectional view through the same.

Fig. 10 is a front view of the end sill of the modification.

Fig. 11 is an enlarged cross sectional view.

Figs. 12, 13 and 14 are detail views.

Figure 1:
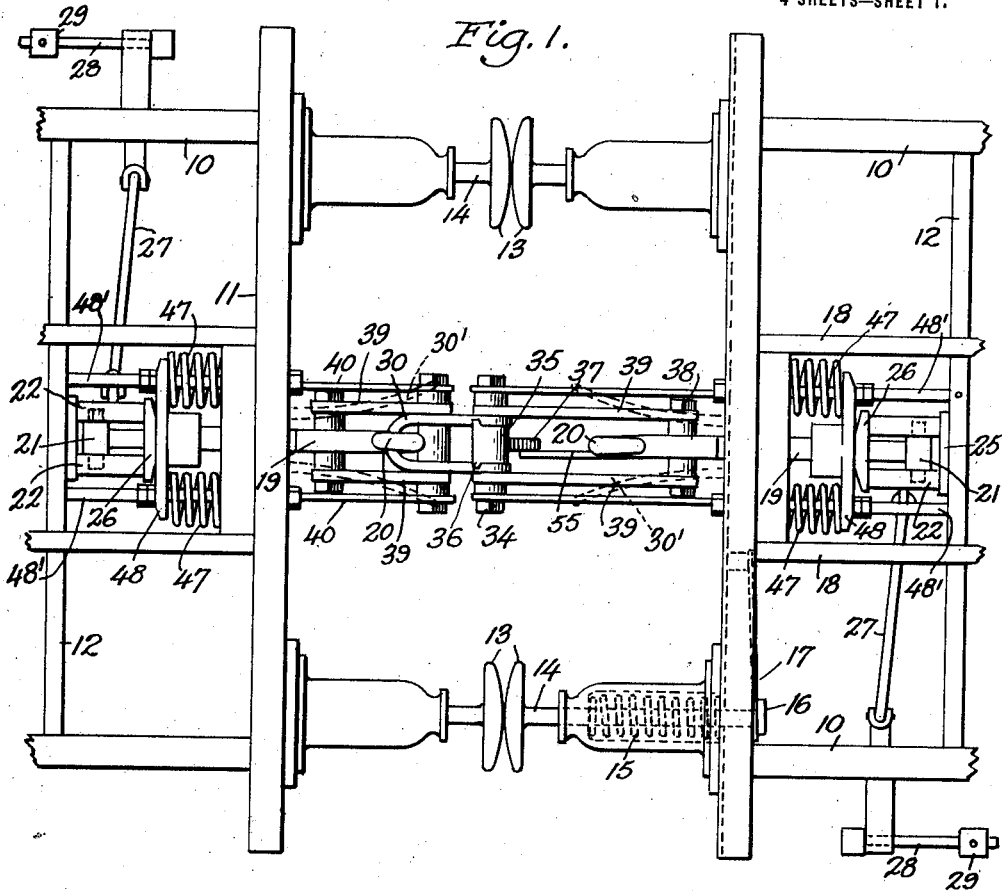
Figure 1 is a plan view of the ends of two cars coupled with the improved device.
Figure 2:
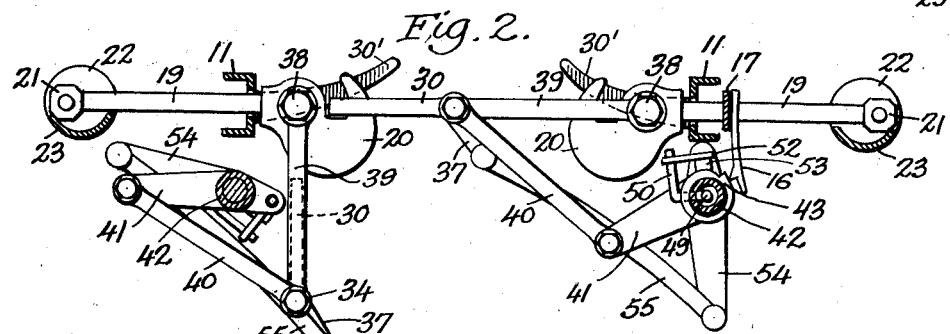
Fig. 2 is a side view of the same.

For convenience of illustration the body of the car is eliminated and the frame is shown in the drawings as having the side sills 10 and the end sills 11 and the cross beams 12, the end sill being provided with buffers comprising a head 13 at the outer ends of the stem 14 which are pressed outward by springs 15 and as shown in Figs. 1 and 2 one of the stems 14 passes through the sill 11 and makes contact with a detent 16 carried by a spring 17 for purposes hereinafter described.

Between inner longitudinal bars 18 is located the draw bar 19 which is the stem of the hook 20 and is pierced at its inner end by a cross pin 21 uniting the cams 22 which are also joined by the plate 23 and screws 23'. The cams 22 play between the plates 25 and 26 and are operated by a rod 27 universally connected with the cams and a handle 28 weighted at each end 29 slides through a head to positively hold it in the preferred position. Two positions of the cams are shown in Figs. 1, 3 and 4, the two latter views showing the hook in its advanced position for setting the link 30 to engage.

Figure 12:
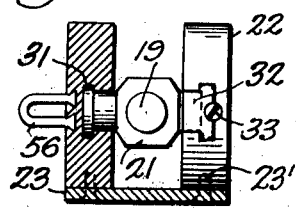
Figure 13:
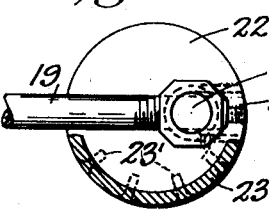

As will be seen in Figs. 12 and 13 the ends 31 of the pins 21 are flanged and let into similarly shaped sockets at the edges of the cams and a plug 32 inserted after the pin and secured in the cams by the screw 33.

The link 30 is U-shaped and its ends are journaled on a bolt which also carries a block 35 with lugs 36 at each front corner and is adapted to move the link to its downward position and from the under side of the block depends a tongue 37 to actuate it. The bolt 34 and the link 30 are hung from the pin 38 that passes through the hook 20 by means of rods 39 which swing on the pin and take the positions shown in Fig. 2, being actuated by the links 40 that are pivoted to the arms 41, the latter carried by a bar below the front sill of the car.

The inoperative position of the link and its adjuncts is shown at the left of Fig. 2 while the right side shows the link engaged with one of the hooks, the hook carrying the operating link being pushed out by means of the handle 28 which has its weight at the left as shown in Figs. 3 and 4. When in position to engage, as shown in Fig. 4, the link 40 and arms 41 with the bar 42 are held in the set position by the detent 16 acting on a tooth 43 of the bar.

As soon as the buffer adjacent the detent 16 is struck and its stem pressed in, the detent is disengaged from the tooth 43 and the whole mechanism drops by its own weight, the bar rotating slightly in its bearings 46 and the link catches the hook before there is time for a rebound. To prevent the link 30 from disengaging, two wings 30' are secured to the end sill on each side of the hook to control the link when the cars are on a curve or switch and guide it and when engaged the link is prevented from uncoupling by retracting the hook and the draw bar 19 by means of the cams 22 and the tension put upon the springs 47, through the cross bar 48, both the springs and cross bar being carried by bolts 48'.

The bar 42 is hollow through part of its length and carries an inner rod 49 having at one end the off set 50 while its outer end is forked as at 51. The off-set extends into a perforation in the end of the short arm of a bell-crank lever 52 pivoted on a stud 53 on the bar 42 and the long arm of the said bell-crank lever enters a perforation in the short end of a loosely pivoted lever 54 carried by the bar and whose other end is connected with the tongue 37 by the rod 55.

The crank arm 56 is pivoted in brackets 57 at the end of the bar 42 and its lower end is fitted in and pinned to the fork 51 of the rod 49 so that the crank arm not only rotates the bar but shifts the rod 49 lengthwise and swings the bell-crank lever 52 on its pivot.

Figure 5:
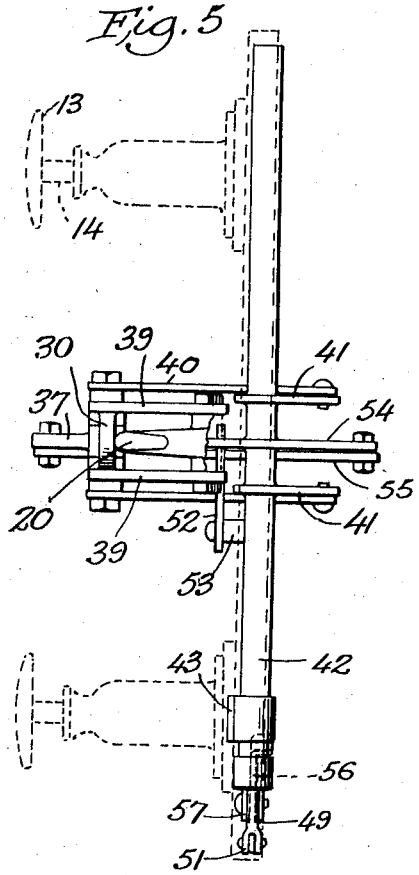
Fig. 5 is a view of the supporting and operating bar with the mechanism inoperative.
Figure 6:
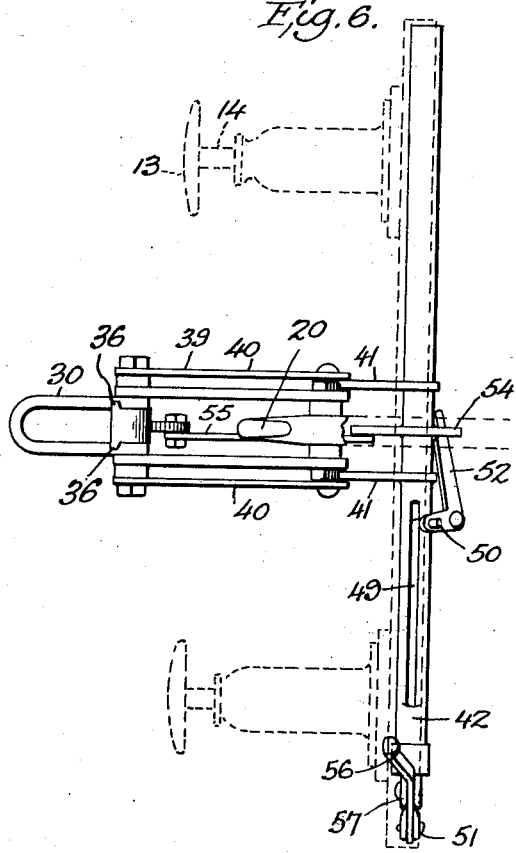
Fig. 6 is a similar view with the link set.
Figure 7:
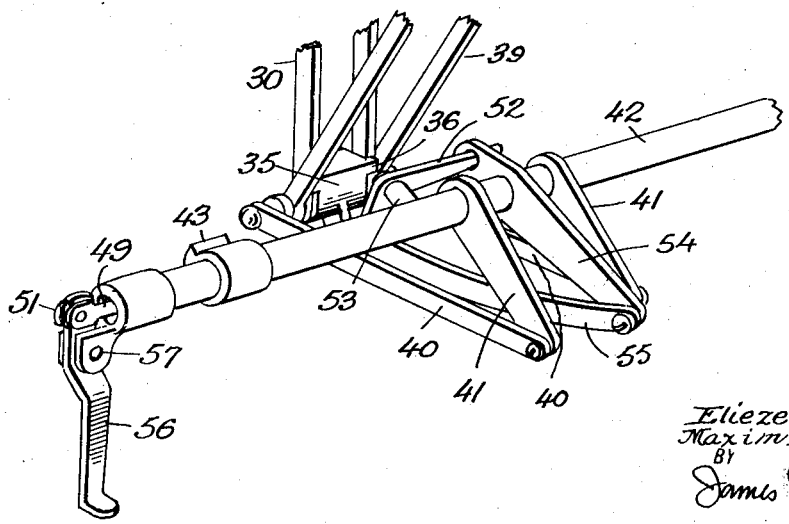
Fig. 7 is a perspective view of the bar.

When it is desired to set the link from the position shown at the left of Fig. 2 to that shown in Fig. 4, or from the position in Fig. 5 to that of Fig. 6, the crank arm is given a half turn with the bar 42 and until the detent 16 engages the tooth 43.

During these movements the link 30 would be swung wide of its destination if it were not controlled by the arm 54 and the rod 55 and by throwing the crank arm backward to draw the rod 49 outward to shift the long arm of the bell-crank lever 52 and cause the arm 54 and link 55 to throw the link down to the position shown in Fig. 4 for engagement.

As the cams change their location along the car frame when strain is put upon the draw bar of both cars, the rod 27 has a knuckle joint connection with a clevis 56 at the side of one of the cams and with the stem of handle 28.

While the construction above described provides for any class of cars the arrangement shown in Figs. 8 to 11 illustrates how the coupler is attached to platform cars and those having rear bolsters 60. The draw bar 19 in this case is of greater length and the head 61 which stands the strain of the cams 62 is located on guides 63 and compresses a spring 64 which bears against one of the bolsters 60. The head at its rear rests upon pins 65 with nuts to limit their movement through a cross bar 66, the whole being located between longitudinal beams 67.

Where the car does not overhang the side sills a handle must be provided for the bar 42 which can be swung freely through one hundred and eighty degrees and such a one is shown in Fig. 14 where the handle 68 is off-set at 69 when secured to the bar and may stand upward or be thrown down as shown in dotted lines when the coupling is effected.

The device thus affords a ready means for coupling cars with dangerous buffers which might otherwise endanger the lives of the trainmen and the use of the handle affords a quick and ready means for elevating and setting the link. In uncoupling cars the draw bar may be extended and a slight movement either re-sets the link or allows the whole mechanism to drop to the inoperative position.

It is obvious that other arrangements or modifications may be resorted to without departing from the essential features above described or from the scope of the appended claims.

What we claim as new is:

1. In a car coupler, the combination with a longitudinally moving draw bar, of rods pivoted on the draw bar, a link at the outer ends of the rods, means for elevating the rods, means for separately manipulating the links, and means operated by a car for releasing the elevating and manipulating means.

2. In a car coupler, the combination with a longitudinally moving draw bar, of rods journaled on the draw bar, a link pivoted to the outer ends of the rods, means for elevating and retaining the rods, means for elevating and holding the link, and means operated by another car for releasing the elevating means.

3. In a car coupler, the combination with a longitudinally moving draw bar, of rods journaled on the draw bar, a link carried at the outer end of the rods, a transverse bar on the car frame and having means for elevating the rods and retaining them in an elevated position, means connected with the transverse bar for elevating and retaining the link, and means operated by another car for releasing the elevating and retaining means.

4. In a car coupler, the combination with a draw bar having a hook at its end, of rods pivoted on the bar, a link pivoted to the outer ends of the rods, a transverse bar having means for elevating the rods, means on the latter bar for elevating the link, means connected with the transverse bar for holding the rods and the link in their elevated positions, means for advancing and retracting the link and rods, and means operated by another car for releasing the rods and the link.

5. In a car coupler, the combination with a movable draw bar having a hook at its outer end, of rods pivoted to the bar, a link at the outer ends of the rods, a transverse rotatable bar, with means adapted to elevate the rods, a rod connected with the transverse bar and having means for elevating the link, a catch adapted to engage the transverse bar and hold the rods and link in an elevated position, means operated by another car for releasing the catch and link, and means for retracting the draw bar.

6. In a car coupler, the combination with a longitudinally shifting draw bar, of a cross pin and eccentric for shifting the said draw bar, rods pivoted to the draw bar, a link at the outer end of the rods, a transverse rotatable hollow bar with arms to elevate the rods, shifting rod in the transverse bar, a pivoted handle to turn the latter and shift the rod, a bell-crank lever operated by the shifting rod, an arm adapted to be rocked by the bell-crank lever, a rod connecting the arm with the link to elevate the latter, a detent adapted to engage a tooth on the transverse rod and hold the rods and link in elevated positions, and a buffer adapted to release the detent.

Signed at New York, in the county of New York and State of New York this 25 day of May, A. D. 1918.

ELIEZER VINOGRAD.
MAXIMILIAN GROTEN.